United States Patent
Liu

(10) Patent No.: US 9,609,366 B2
(45) Date of Patent: Mar. 28, 2017

(54) DIGITAL TELEVISION TERMINAL, VIDEO FILE PLAYING METHOD AND VIDEO FILE PLAYING SYSTEM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 75 days.

(21) Appl. No.: 14/604,341

(22) Filed: Jan. 23, 2015

(65) Prior Publication Data
US 2015/0135229 A1    May 14, 2015

Related U.S. Application Data

(63) Continuation of application No. PCT/CN2013/079887, filed on Jul. 23, 2013.

(30) Foreign Application Priority Data

Jul. 26, 2012  (CN) .......................... 2012 1 0261564

(51) Int. Cl.
*H04N 5/455* (2006.01)
*G06F 3/00* (2006.01)
(Continued)

(52) U.S. Cl.
CPC ... *H04N 21/23109* (2013.01); *H04L 67/2842* (2013.01); *H04N 21/2183* (2013.01);
(Continued)

(58) Field of Classification Search
CPC ........... H04N 5/44543; H04N 21/4755; H04N 21/84; H04N 21/47202; G06F 9/5027; H04L 29/08153; H04L 67/1065
See application file for complete search history.

(56) References Cited

U.S. PATENT DOCUMENTS 6,772,147 B2 *  8/2004  Wang ................ G06F 17/30867
                                                   348/E7.071
8,997,151 B2 *  3/2015  Chai .................. H04N 5/44543
                                                   725/39
(Continued)

FOREIGN PATENT DOCUMENTS

CN        101686376 A      3/2010
CN        102238137 A     11/2011
(Continued)

OTHER PUBLICATIONS

Extended European Search Report for European Patent Application No. 13822085.0, dated Nov. 6, 2015, in 8 pages.
(Continued)

*Primary Examiner* — James R Marandi
(74) *Attorney, Agent, or Firm* — Knobbe Martens Olson & Bear LLP

(57) ABSTRACT

Provided are a digital television terminal, a video file playing method and a video file playing system. The terminal comprises: a video file retrieval unit for receiving a retrieval request input by a user, sending the retrieval request to an offline task management server in an offline download system, and receiving a retrieval result returned by the offline task management server; a data download unit for, when a play request for the user to select and play one video file in the retrieval result is received, downloading the selected video file from a cloud storage server which is associated with a preset video file list in the offline download system; a data cache unit for caching the video file down-
(Continued)

loaded by the data download unit; and a video playing unit for playing the video file acquired from the data cache unit. The embodiments of the present invention realize video file.

13 Claims, 9 Drawing Sheets

(51) Int. Cl.
    *H04N 21/231*     (2011.01)
    *H04N 21/433*     (2011.01)
    *H04N 21/472*     (2011.01)
    *H04N 21/2183*     (2011.01)
    *H04N 21/239*     (2011.01)
    *H04N 21/262*     (2011.01)
    *H04N 21/2665*     (2011.01)
    *H04N 21/462*     (2011.01)
    *H04N 21/466*     (2011.01)
    *H04N 21/482*     (2011.01)
    *H04N 21/61*     (2011.01)
    *H04L 29/08*     (2006.01)
    *G06F 9/50*     (2006.01)

(52) U.S. Cl.
    CPC ... *H04N 21/2393* (2013.01); *H04N 21/23106* (2013.01); *H04N 21/2665* (2013.01); *H04N 21/26241* (2013.01); *H04N 21/4331* (2013.01); *H04N 21/4332* (2013.01); *H04N 21/4622* (2013.01); *H04N 21/4668* (2013.01); *H04N 21/47202* (2013.01); *H04N 21/4826* (2013.01); *H04N 21/4828* (2013.01); *H04N 21/6125* (2013.01); *G06F 9/5027* (2013.01); *H04L 29/08153* (2013.01)

(56) References Cited

U.S. PATENT DOCUMENTS

| | | |
|---|---|---|
| 2002/0078176 A1 | 6/2002 | Nomura et al. |
| 2005/0165849 A1 | 7/2005 | Moradi et al. |
| 2007/0174471 A1 | 7/2007 | Van Rossum |
| 2008/0109823 A1 | 5/2008 | Whitfield et al. |
| 2011/0140937 A1 | 6/2011 | Lai et al. |
| 2012/0060181 A1* | 3/2012 | Craner ............... H04N 21/4532 725/28 |

FOREIGN PATENT DOCUMENTS

| | | |
|---|---|---|
| CN | 102387220 A | 3/2012 |
| CN | 102487375 A | 6/2012 |
| WO | WO 2009/148268 A2 | 12/2009 |

OTHER PUBLICATIONS

International Search Report for International Aplication No. PCT/CN2013/079887, mailed on Oct. 31, 2013.
Translation of the International Preliminary Report on Patentability and Written Opinion of the International Searching Authority for International Application No. PCT/CN2013/079887, mailed on Feb. 5, 2015, in 11 pages.

* cited by examiner

DIGITAL TELEVISION TERMINAL, VIDEO FILE PLAYING METHOD AND VIDEO FILE PLAYING SYSTEM This application is a continuation of International Application No. PCT/CN2013/079887, filed on Jul. 23, 2013. This application claims the benefit and priority of Chinese Patent Application No. 201210261564.1, filed on Jul. 26, 2012, in Chinese Patent Office, entitled "digital television terminal, video file playing method and video file playing system." The disclosure of which is incorporated herein by reference in its entirety.

FIELD

The present disclosure relates to computer technology, and more particularly, to a digital television terminal, a video file playing method and a video file playing system.

BACKGROUND

With the development of triple-play, a television terminal has been more and more closely related with the internet. The hardware of the television terminal updates continuously, and the capability of the television terminal for processing high-definition video file is more and more strong. At present, most of television makers have introduced smart televisions and cloud televisions, capable of playing multimedia content on the Internet on demand.

However, in general, the multimedia content is not open, and is provided by a certain fixed operator or television maker. Relative to the mass and rich Internet content, the multimedia content is very insufficient, which leads to the underdevelopment of the advantages of the Over the Top television (OTT television). Therefore, a smart television possessing a network browser or video playback client is introduced. However, when a video file (especially a high-definition video file) is viewed via the network browser or video playback client provided by the smart television, the viewing process will be restricted by the network bandwidth, and the download speed of the video file is slow, which leads to the network congestion, and thereby occurring a pause, gibberish, and so on. Thus the playing quality of the high-definition video file is decreased.

SUMMARY

In view of above, embodiments of the present disclosure provide a digital television terminal, a video file playing method and a video file playing system, so as to resolve the problem that the playing quality of a video file is low.

The digital television terminal provided by embodiments of the present disclosure includes:

a video file searching unit, configured to receive a video search request inputted by a user, and send the video search request to an offline task management server of an offline download system, so that the offline task management server may search a preset video file list according to the video search request; receive a search result returned by the offline task management server;

a data download unit, configured to, when receiving a playing request for playing one video file selected by the user from the search result, download the video file selected by the user from a cloud storage server which is in the offline download system and associated with the preset video file list;

a data cache unit, configured to cache the video file downloaded by the data download unit; and a video playing unit, configured to play the video file obtained from the data cache unit.

The video file playing method provided by embodiments of the present disclosure includes:

receiving a video search request inputted by a user, sending the video search request to an offline task management server in an offline download system, so that the offline task management server may search a preset video file list according to the video search request; receiving a search result returned by the offline task management server;

receiving a playing request for playing one video file selected by the user from the search result, downloading the video file selected by the user from a cloud storage server which is in the offline download system and associated with the preset video file list; and caching and playing downloaded video file.

The video file playing system provided by embodiments of the present disclosure includes:

a digital television terminal, configured to receive a video search request inputted by a user, send the video search request to an offline task management server of an offline download system, and receive a search result returned by the offline task management server; receive a playing request for playing one video file selected by the user from the search result, download selected video file from a cloud storage server which is in the offline download system and associated with a preset video file list, cache and play downloaded video file; and the offline download system, configured to, when receiving the video search request sent by the digital television terminal, search the preset video file list according to the video search request, and return the search result to the digital television terminal.

As can be seen, examples of the present disclosure provide a digital television terminal, in which, a video file searching unit receives a video search request inputted by a user, and send the video search request to the offline task management server of the offline download system, so that the offline task management server may search a preset video file list according to the video search request; receives a search result returned by the offline task management server; when receiving a playing request for playing one video file selected by the user from the search result, the data download unit downloads the selected video file from the cloud storage server which is in the offline download system and associated with the preset video file list; the data cache unit is configured to cache the video file downloaded by the data download unit; the video playing unit is configured to play the video file obtained from the data cache unit. By using an example of the present disclosure, the local digital television terminal may share video files in the offline download system, the fast download of a video file may be achieved, and the playing quality of a video file may be improved.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

In order to make objectives, technical solutions and advantages of the present disclosure clearer, the present disclosure will be described in detail hereinafter with reference to examples and accompanying drawings. The specific examples described hereinafter are only used for illustrative purposes of the present disclosure, and not intended to limit the protection scope thereof.

In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

Figure 1A:
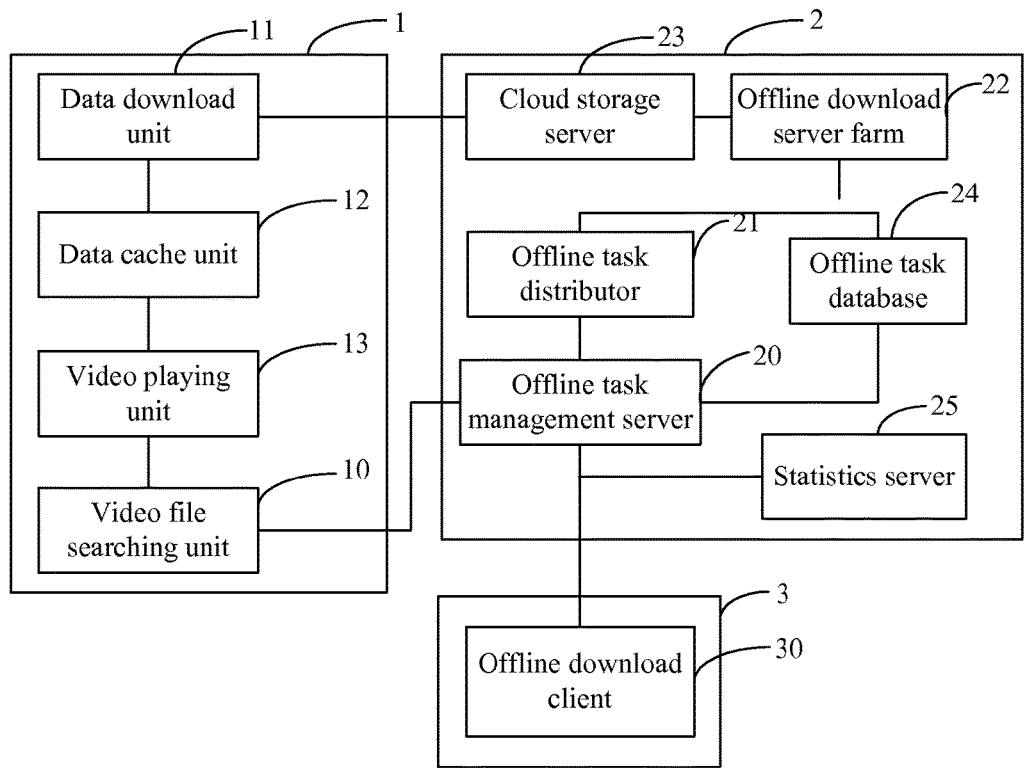
FIG. 1A is a schematic diagram illustrating a video file playing system according to an example of the present disclosure.

FIG. 1A is a schematic diagram illustrating a video file playing system according to an example of the present disclosure. To facilitate description, only relevant parts are shown. As shown in FIG. 1A, the system includes a digital television terminal 1, an offline download system 2 and a computer terminal 3 which shares a video file in the offline download system 2 with the digital television terminal 1. The offline download system 2 includes an offline task management server 20, an offline task distributor 21, an offline download server farm 22, a cloud storage server 23, an offline task database 24 and a statistics server 25. The computer terminal 3 includes an offline download client 30.

The offline download client 30 is configured to receive an inputted offline download task request, and submit the offline download task request to the offline task management server 20. The offline download client 30 may be a special client or browser. After the download task is finished, the offline download client 30 may report information, including download time, download speed, download result, file size, original link of the download task, and download speed and download time obtained by different Uniform/Universal Resource Locator (URL) sources, to the statistics server 25, and provide a function for querying offline download progress. For a completed offline download task, the offline download client 30 may obtain the downloaded video file at high speed through a Peer to Server and Peer (P2SP) mode or other download protocol.

The offline task management server 20 is configured to receive the offline download task request submitted by the offline download client 30, and generate an unique identification number for each independent offline download task; write original link information of the offline download task in the offline task database 24; receive a download progress report sent by the offline task distributor 21; provide a function for querying offline download progress by the offline download client 30; and receive an offline download task query request, a video search request and an offline transcoding task request sent by an offline download user.

The offline task distributor 21 is configured to receive a load information report sent by a node in the offline download server farm 22, according to the load of the node in the offline download server farm 22, dynamically schedule offline download tasks and offline transcoding tasks to be performed on different nodes in the offline download server farm 22, and receive a report on download progress and speed information of the nodes in the offline download server farm 22, and simultaneously report the progress information to the offline task management server 20.

The offline download server farm 22 is configured to receive the progress information of the offline task distributor 21, and obtain a download link from the offline task database 24, perform the download according to the download link, and store downloaded multimedia content including a video file in the cloud storage server 23, or perform offline transcoding on downloaded video file, so that the transcoded video file may be downloaded, report progress and speed information of offline download and offline transcoding to the offline task distributor 21, register an address of the offline download server farm 22 on the offline task distributor 21, and provide a report on load information including disk space, CPU, and the like, to the offline task distributor 21, so that the offline task distributor 21 may perform dynamic and balanced scheduling according to the load information.

The cloud storage server 23 is configured to store the data downloaded by the offline download server farm 22 for downloading.

The offline task database 24 is configured to store the offline download task information received by the offline task management server 20 from the offline download client 30, so that the offline download server farm 22 may obtain the offline download task information. The offline download task information, for instance, includes a task identification number, original link information of an offline download task, and the like.

The statistics server 25 is configured to receive a report on information including URL download speed, download time, connection status, download result and file size during the process of downloading and after the downloading is completed sent by the offline download client 30, and generate a log for subsequent statistics and analysis.

Figure 1B:
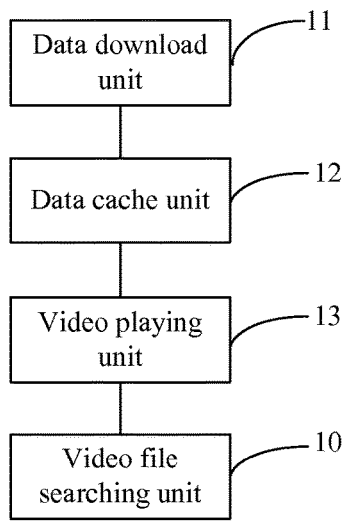
FIG. 1B is a schematic diagram illustrating a digital television terminal according to an example of the present disclosure.

FIG. 1B is a schematic diagram illustrating a digital television terminal according to an example of the present disclosure. As shown in FIG. 1B, the digital television terminal 1 includes a video file searching unit 10, a data download unit 11, a data cache unit 12 and a video playing unit 13.

The video file searching unit 10 is configured to receive a video search request which is inputted by a user and includes a search word, and send the video search request to the offline task management server 20 of the offline download system 2, so that the offline task management server 20 may search a preset video file list with received search word and return a search result. The video file searching unit 10 receives the search result returned by the offline task management server 20. Video files which are downloaded in the offline download system 2 and stored in the cloud storage server 23 by the user are recorded in the preset video file list. Each user corresponds to one video file list. Content of the same video file is stored only once, but the same video file may belong to video file lists of different users.

In the example of the present disclosure, after receiving the video search request which is inputted by the user and includes a search word, the video file searching unit 10 sends the video search request to the offline task management server 20, and the offline task management server 20 searches a video file list corresponding to the user, and returns a corresponding search result.

In the example of the present disclosure, when a video file is found, the offline task management server 20 returns corresponding video file information, such as, file size, format, and so on. When no video file is found, the offline task management server 20 returns corresponding prompt information to prompt the user that no corresponding video file is found.

When the user selects one video file in the search result to play, namely a playing request for playing one video file selected by the user from the search result is received, the data download unit 11 downloads the selected video file from the cloud storage server 23.

The data cache unit 12 is configured to cache the video file downloaded by the data download unit 11.

In the example of the present disclosure, in order to guarantee the correctness and completeness of the video data, the data download unit 11 may perform correctness and completeness verification on a data block downloaded from the cloud storage server 23, and then write a data block which passes the verification into the data cache unit 12.

The video playing unit 13 is configured to play the video file obtained from the data cache unit 12.

For example, a user of the computer terminal 3 may submit an offline download request to the offline download system 2 via the offline download client 30 of the computer terminal 3, the offline download system 2 may perform offline download of the video file, and store downloaded video file into the cloud storage server 23. After the offline download is finished, the video file may be downloaded to the computer terminal 3 at high speed via a corresponding client to be played. The corresponding client refers to a terminal device capable of performing download from the cloud storage server 23 according to a standard protocol, such as HTTP protocol.

When receiving the video search request including a search word and inputted by the user, the user of the digital television terminal 1 sends the video search request to the offline task management server 20 of the offline download system 2, so that the offline task management server 20 may search a preset video file list with received search word and return a search result. The digital television terminal 1 receives the search result returned by the offline task management server 20. When receiving a playing request for playing one video file selected by the user from the search result, the digital television terminal 1 downloads the selected video file from the cloud storage server 23, associated with a video file list, in the offline download system 2, caches and plays downloaded video file. Thus the video file in the offline download system 2 may be played via the digital television terminal 1.

In the example of the present disclosure, the digital television terminal 1 is associated with the offline download system 2, which achieves the sharing of a large number of video files in the offline download system 2, and achieves the integration of Internet and digital television terminals. Thus video files stored in the cloud storage server 23 in the offline download system 2 may be directly downloaded at high speed, the video file playing may be achieved, and the playing quality of the video file on the digital television terminal 1 may be enhanced.

Figure 2A:
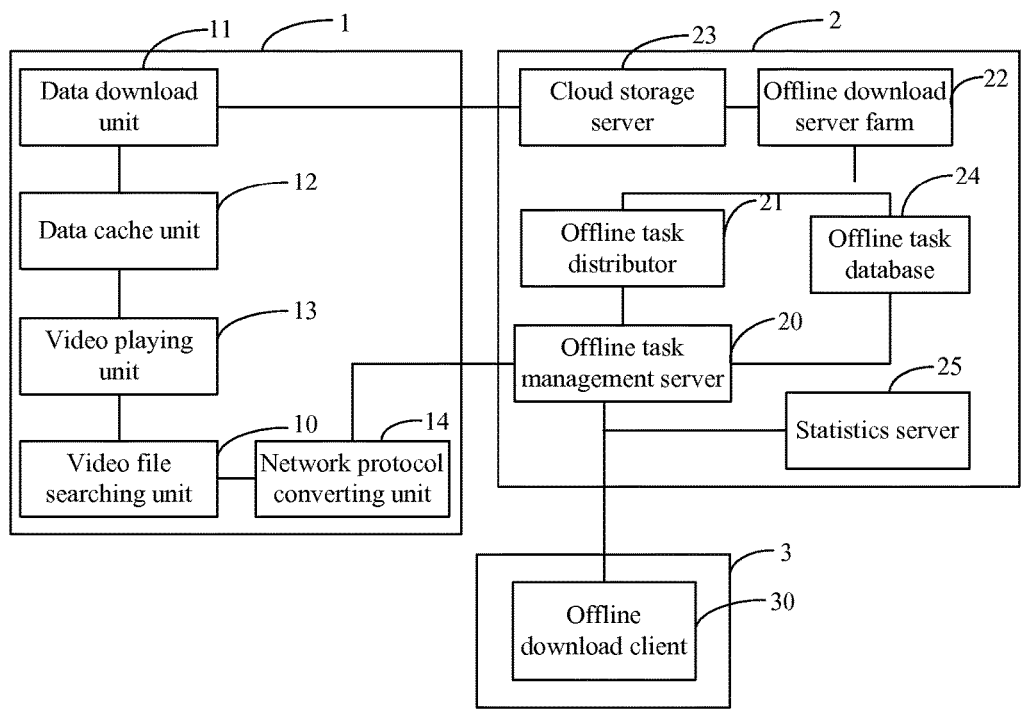
FIG. 2A is a schematic diagram illustrating a video file playing system according to another example of the present disclosure.

FIG. 2A is a schematic diagram illustrating a video file playing system according to another example of the present disclosure. To facilitate description, only relevant parts are shown.

Figure 2B:
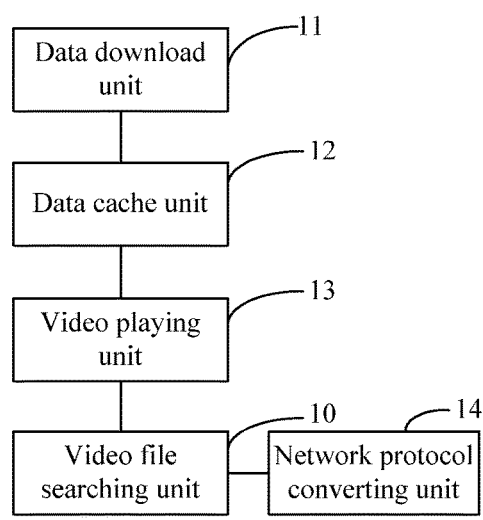
FIG. 2B is a schematic diagram illustrating a digital television terminal according to another example of the present disclosure.

Considering that the network protocol used by the digital television terminal 1 may be different from the network protocol used by the offline task management server 20, in the example of the present disclosure, a network protocol converting unit 14 is added in the digital television terminal 1. As shown in FIG. 2B, the network protocol converting unit 14 is configured to perform network protocol data conversion between the digital television terminal 1 and the offline task management server 20. In the specific implementation, the network protocol converting unit 14 may establish corresponding interoperability rules. In the interoperability rules, a mapping relationship between a network protocol (such as session initiation protocol (SIP) and television makers private protocol) used by the digital television system and a network protocol used by the mainstream offline task management server (such as Hypertext transfer protocol (HTTP)) is established, thereby increasing the interconnection and intercommunity capability between the digital television terminal 1 and the offline download system 2.

In the example of the present disclosure, when receiving a command request from a sender (such as the video file searching unit 10 or the offline task management server 20), the network protocol converting unit 14 parses the command request according to encapsulation format of the network protocol used by the sender, after obtaining data in the command request, encapsulates the data according to encapsulation format of the network protocol used by the receiver, and sends encapsulated data to the receiver. For example, when the video file searching unit 10 receives the video search request including a search word and inputted by the user, network protocol data conversion may be performed on the video search request by the network protocol converting unit 14, and then the video file searching unit 10 may send converted video search request which includes the search word and may be identified by the offline task management server 20 to the offline task management server 20. Similarly, when receiving the search result returned by the offline task management server 20, the network protocol converting unit 14 converts the search result to data which may be identified by the video file searching unit 10.

The functions of other units in the digital television terminal shown in FIG. 2B are the same as that in FIG. 1B, and no further descriptions will be given hereinafter.

In the example of the present disclosure, by adding the network protocol converting unit 14, the interoperability between the digital television terminal 1 and the offline download system 2 is enhanced, furthermore, the interconnection and intercommunity capacity between the digital television terminal 1 and the offline download system 2 is increased.

Figure 3A:
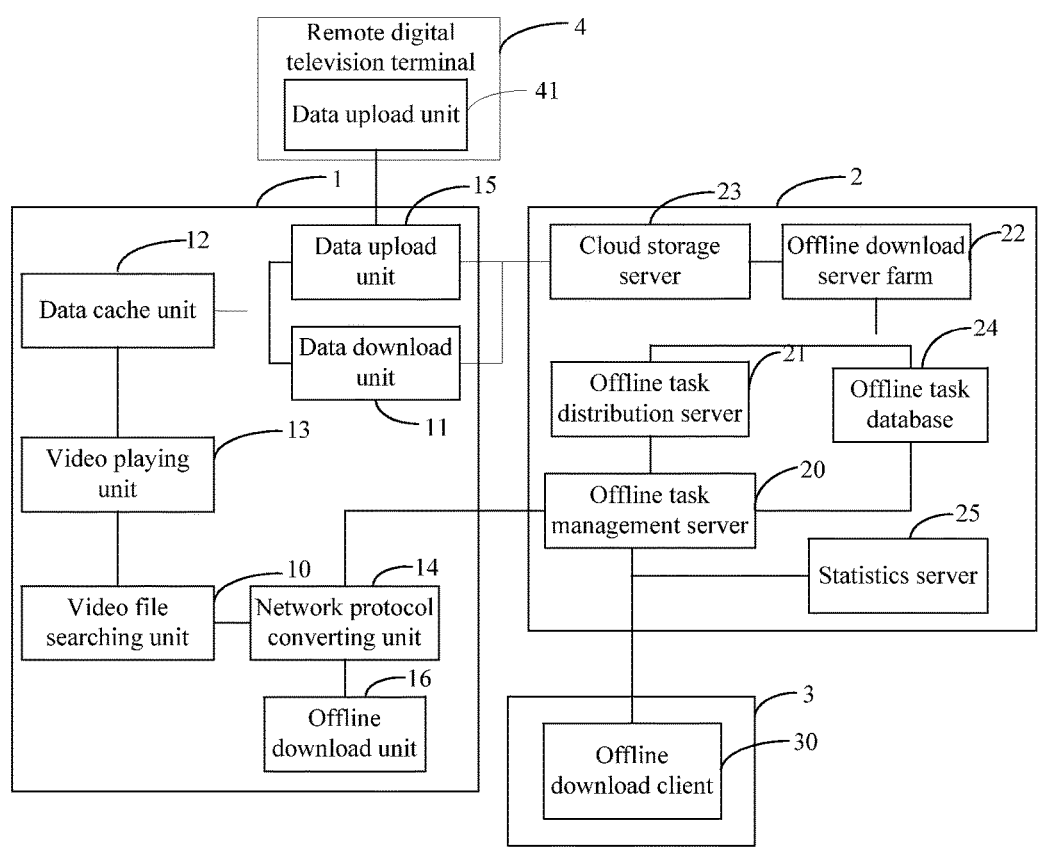
FIG. 3A is a schematic diagram illustrating a video file playing system according to yet another example of the present disclosure.

FIG. 3A is a schematic diagram illustrating a video file playing system according to yet another example of the present disclosure. To facilitate description, only relevant parts are shown.

Figure 3B:
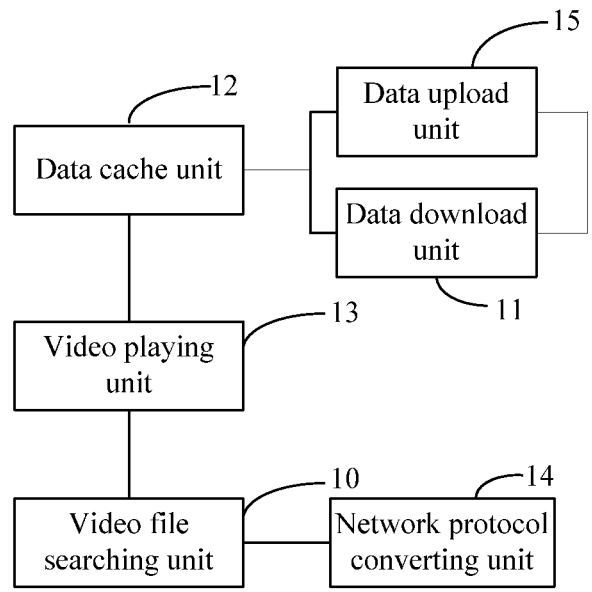
FIG. 3B is a schematic diagram illustrating a digital television terminal according to yet another example of the present disclosure.

In the example of the present disclosure, in order to improve the download speed and transmission efficiency of the data, a data upload unit 15 is added based on above mentioned digital television terminal, as shown in FIG. 3B.

When receiving a request for uploading a video file, the data upload unit 15 obtains the video file from the data cache unit 12, and uploads the video file to the cloud storage server 23 or a remote digital television terminal 4. In specific implementation, when the remote digital television terminal 4 plays the video file, in order to make the best of existing broadband, while downloading data from the cloud storage server 23, the remote digital television terminal 4 may also send a request for uploading the video file to a local digital television terminal 1 connected with the network. When the local digital television terminal 1 receives the request, the data upload unit 15 may obtain the video file from the data cache unit 12, and upload the video file to the cloud storage server 23, and then the cloud storage server 23 may forward the video file to the remote digital television terminal 4, or the data upload unit 15 may directly send obtained video file to the remote digital television terminal 4. Thus the remote digital television terminal 4 may simultaneously obtain the video file from the cloud storage server 23 and the local digital television terminal 1 connected with the network, thereby increasing the video file download speed and the bandwidth utilization. Simultaneously, the local digital television terminal 1 may also download video data uploaded by a data upload unit 41 of the remote digital television terminal 4 through the data download unit 11, thereby further increasing the video file download speed of the local digital television terminal 1.

Figure 3C:
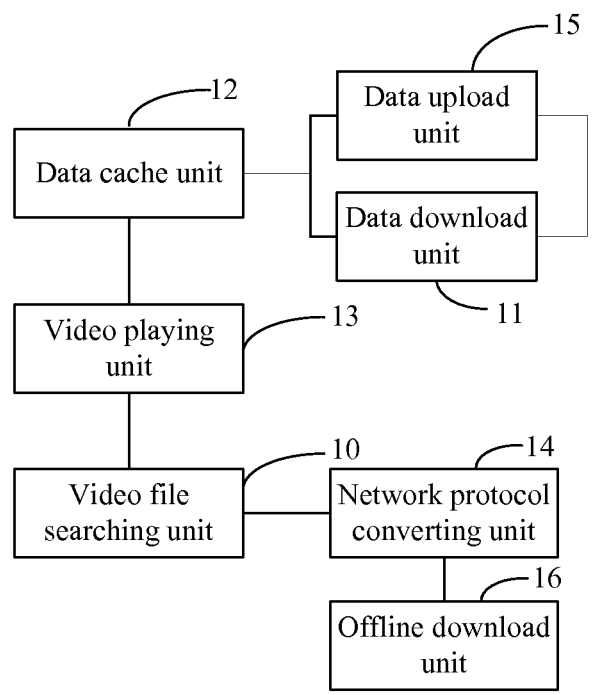
FIG. 3C is a schematic diagram illustrating a digital television terminal according to yet another example of the present disclosure.

In another example of the present disclosure, an offline download unit 16 may be integrated in the digital television terminal 1. As shown in FIG. 3C, the offline download unit 16 is configured to, when the offline task management server 20 finds no video file from the preset video file list according to received search word, receive an offline download task request inputted by a user, and submit the offline download task request to the offline task management server 20. Specifically, if the network protocol used by the local digital television terminal 1 is the same as the network protocol used by the offline task management server 20, when receiving the offline download task request inputted by the user, the offline download unit 16 submits the offline download task request to the offline task management server 20. If the network protocol used by the local digital television terminal 1 is different from the network protocol used by the offline task management server 20, after the network protocol converting unit 14 performs network protocol data conversion on the offline download task request, the offline download unit 16 submits the converted offline download task request to the offline task management server 20. The offline download unit 16 may be further configured to receive an inputted request for querying progress of an offline download task, submit the request for querying progress of the offline download task to the offline task management server 20, and receive a query result returned by the offline task management server 20. When the network protocol used by the local digital television terminal 1 is different from the network protocol used by the offline task management server 20, the network protocol converting unit 14 is requested to perform the network protocol data conversion.

In the example of the present disclosure, the offline download unit 16 is integrated in the digital television terminal 1, when no video file, corresponding to the search word inputted by the user, is found, the offline download task may be submitted through the offline download unit 16, thus the offline download of a video file on the digital television terminal 1 is achieved, and the process of offline download is simplified, thereby increasing integration level and intelligence degree of the video file playing system.

Figure 4A:
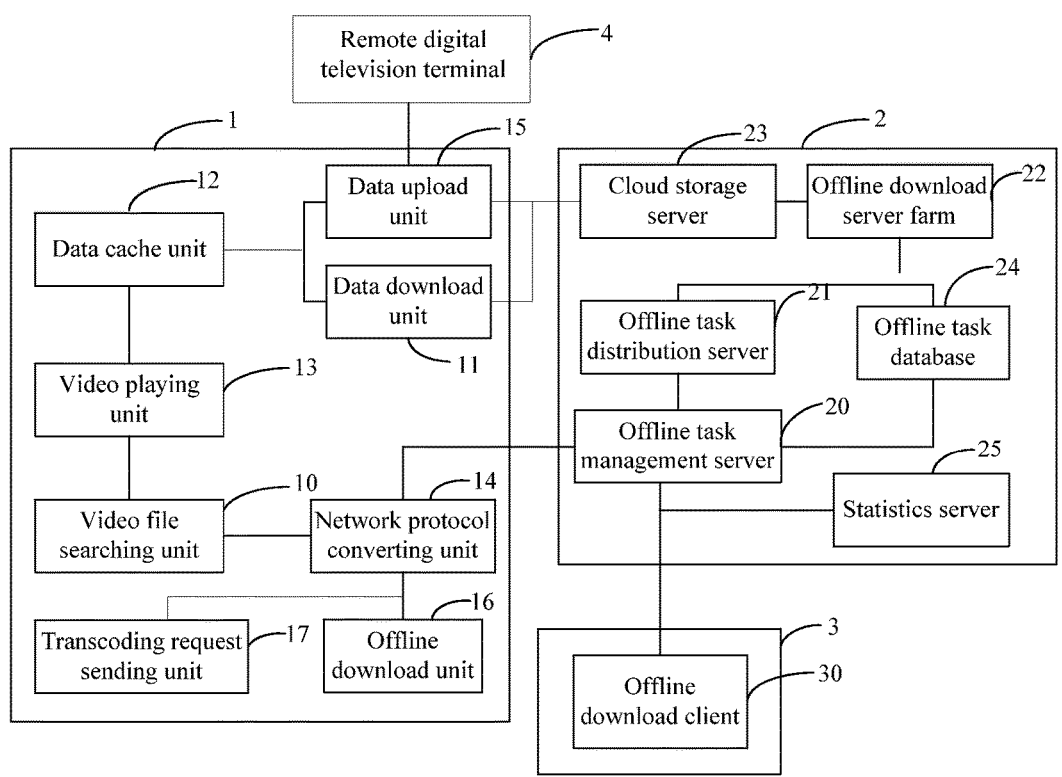
FIG. 4A is a schematic diagram illustrating a video file playing system according to yet another example of the present disclosure.

FIG. 4A is a schematic diagram illustrating a video file playing system according to yet another example of the present disclosure. To facilitate description, only relevant parts are shown.

Figure 4B:
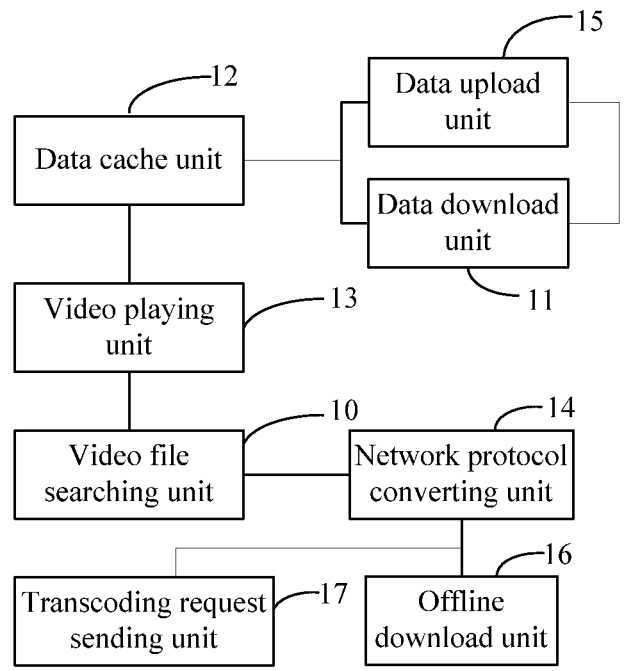
FIG. 4B is a schematic diagram illustrating a digital television terminal according to yet another example of the present disclosure.

In the example of the present disclosure, based on above mentioned digital television terminal, a transcoding request sending unit 17 is added. As shown in FIG. 4B, the transcoding request sending unit 17 is configured to, when the format of a video file which the user selects to play does not comply with the preset video file format, send an offline transcoding task request to the offline task management server 20, so that the offline download system 2 may complete transcoding of the video file, and store transcoded video file in the cloud storage server 23. Therefore, the data download unit 11 may download the transcoded video file from the cloud storage server 23, thus the compatibility of the video file playing system may be increased.

Figure 5:
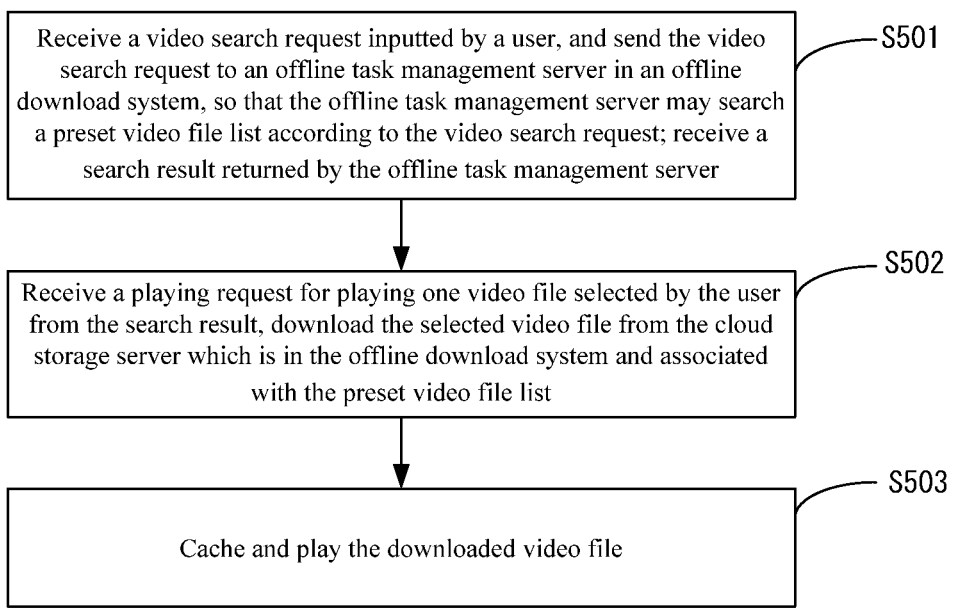
FIG. 5 is a flowchart illustrating a video file playing method according to an example of the present disclosure.

FIG. 5 is a flowchart illustrating a video file playing method according to an example of the present disclosure. The method applies to the digital television terminal provided by examples of the present disclosure. The method includes the following operations.

In block S501, a video search request inputted by a user is received, and the video search request is sent to an offline task management server in an offline download system, so that the offline task management server may search a preset video file list according to the video search request; a search result returned by the offline task management server is received.

In the example of the present disclosure, the digital television terminal includes a video file searching unit, a data download unit, a data cache unit and a video playing unit. The video file searching unit is configured to receive a video search request including a search word and inputted by a user, and send the video search request to the offline task management server of the offline download system, so that the offline task management server may search a preset video file list with received search word and return a search result. Video files which are downloaded in the offline download system and stored in the cloud storage server by the user are recorded in the preset video file list.

In block S502, a playing request for playing one video file selected by the user from the search result is received, the selected video file is downloaded from the cloud storage server which is in the offline download system and associated with the preset video file list.

In block S503, the downloaded video file is cached and played.

In the example of the present disclosure, in order to improve the download speed and transmission efficiency of the data, the digital television terminal may further include a data upload unit. When receiving a request for uploading a video file, the data upload unit obtains the video file from the data cache unit, and uploads the video file to a cloud storage server or a remote digital television terminal. In specific implementation, when the remote digital television terminal plays the video file, in order to make the best of existing broadband, while downloading data from the cloud storage server, the remote digital television terminal may also send a request for uploading the video file to a local digital television terminal connected with the network. When the local digital television terminal receives the request, the data upload unit may obtain the video file from the data cache unit, and upload the video file to the cloud storage server, and then the cloud storage server may forward the video file to the remote digital television terminal, or the data upload unit may directly send obtained video file to the remote digital television terminal.

Thus the remote digital television terminal may simultaneously obtain the video file from the cloud storage server and the local digital television terminal connected with the network, thereby increasing the video file download speed and the bandwidth utilization. Simultaneously, the local digital television terminal may also download video data uploaded by a data upload unit of the remote digital television terminal through the data download unit, thus the video file download speed of the local digital television terminal may be further increased.

Furthermore, in the example of the present disclosure, the digital television terminal may further include an offline download unit, configured to receive an offline download task request inputted by a user, and submit the offline download task request to the offline task management server. The offline download unit may be further configured to receive an inputted request for querying progress of an offline download task, submit the request for querying progress of the offline download task to the offline task management server, and receive a query result returned by the offline task management server.

Furthermore, in the example of the present disclosure, the digital television terminal may further include a transcoding request sending unit. When the format of a video file which the user selects to play does not comply with the preset video file format, the transcoding request sending unit sends an offline transcoding task request to the offline task management server, so that the offline download system may complete transcoding of the video file, and store transcoded video file in the cloud storage server. Therefore, the data download unit may download the transcoded video file from the cloud storage server, thus the compatibility of the video file playing system may be increased.

Furthermore, in the example of the present disclosure, the digital television terminal may further include a network protocol converting unit, configured to perform network protocol data conversion between the digital television terminal and the offline task management server. In the specific implementation, the network protocol converting unit may establish corresponding interoperability rules. In the interoperability rules, a mapping relationship between a network protocol (such as SIP and a private protocol of television makers) used by the digital television system and a network protocol used by the mainstream offline task management server (such as HTTP) is established, thus the interconnection and intercommunity capability between the digital television terminal 1 and the offline download system may be increased.

In the example of the present disclosure, when a user selects one video file from the search result returned by the offline task management server to play, the digital television terminal downloads the selected video file from the cloud storage server, caches and plays the downloaded video file. Thus the sharing of video files in the offline download system may be achieved, and the integration of Internet and digital television terminals may be achieved. Thus video files stored in the cloud storage server may be directly downloaded at high speed, the video file playing may be achieved, and the playing quality of the video files on the digital television terminal 1 may be enhanced.

Figure 6A:
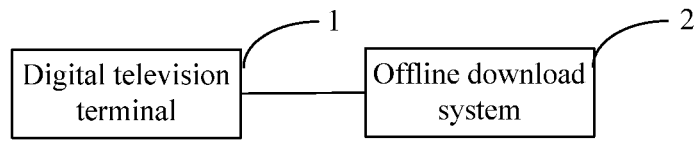
FIG. 6A is a schematic diagram illustrating a video file playing system according to yet another example of the present disclosure.

The examples of the present disclosure further provide a video file playing system, as shown in FIG. 6A. The video file playing system includes a digital television terminal 1 and an offline download system 2.

The digital television terminal 1 is configured to receive a video search request including a search word and inputted by a user, and send the video search request to an offline task management server of the offline download system 2, so that the offline task management server may search a preset video file list according to the video search request; and receive a search result returned by the offline task management server; receive a playing request for playing one video file selected by the user from the search result, download the selected video file from the cloud storage server which is in the offline download system 2 and associated with the preset video file list, cache and play the downloaded video file.

The offline download system 2 is configured to, when receiving the video search request including the search word and sent by the digital television terminal 1, search the preset video file list with the search word, and return a corresponding search result to the digital television terminal 1.

Figure 6B:
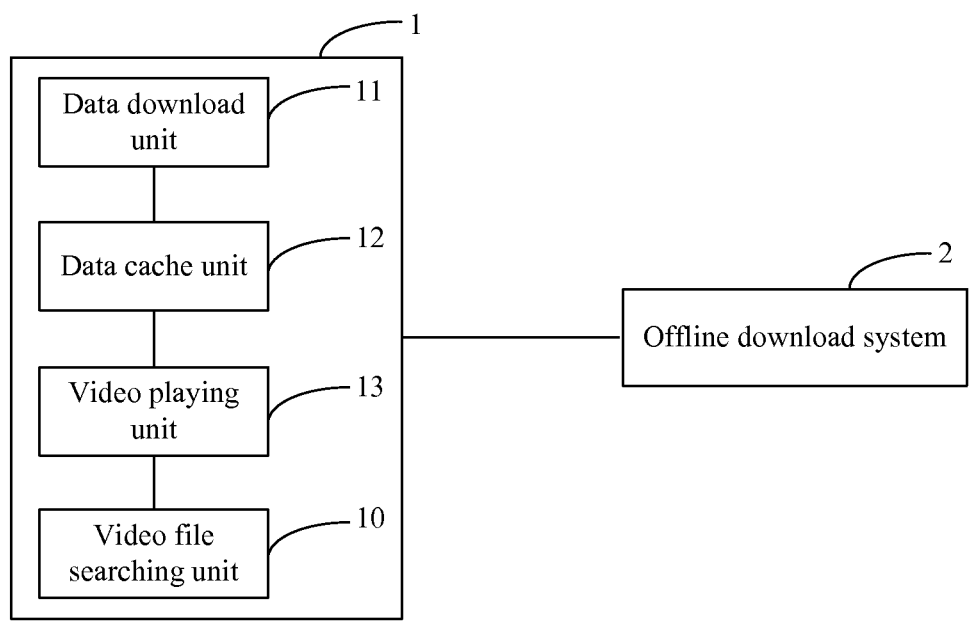
FIG. 6B is a schematic diagram illustrating a video file playing system according to yet another example of the present disclosure.

In the example of the present disclosure, the digital television terminal 1 includes a video file searching unit 10, a data download unit 11, a data cache unit 12 and a video playing unit 13, as shown in FIG. 6B. The video file searching unit 10 is configured to receive the video search request including the search word and inputted by a user, and send the video search request to the offline task management server of the offline download system 2, so that the offline task management server may search a preset video file list with received search word and return a search result. The video file searching unit 10 receives the search result returned by the offline task management server. The data download unit 11 is configured to, when the user selects one video file from the search result to play, download the selected video file from the cloud storage server which is in the offline download system and associated with the preset video file list. The data cache unit 12 is configured to cache the video file downloaded by the data download unit 11. The video playing unit 13 is configured to play the video file obtained from the data cache unit 12.

The units in above mentioned examples of the present disclosure may be integrated or may be separated distributed. The units in above mentioned examples may be integrated into one unit or may be further divided into multiple sub-units.

In the example of the present disclosure, the digital television terminal is associated with the offline download system, which achieves the sharing of a large number of video files in the offline download system, and achieves the integration of Internet and digital television terminals. Thus video files stored in the cloud storage server in the offline download system may be directly downloaded at high speed, the video file playing may be achieved, and the playing quality of the video file on the digital television terminal 1 may be enhanced. In addition, by adding the network protocol converting unit, the interoperability between the digital television terminal and the offline download system is increased, and subsequently the interconnection and inter-community capability between the digital television terminal and the offline download system is increased. By integrating the data upload unit, the local digital television terminal may download video data uploaded by a data upload unit of a remote digital television terminal through the data download unit, thus the video file download speed of the local digital television terminal may be increased, subsequently, the playing quality of video file on the digital television terminal is increased as a whole.

Figure 7A:
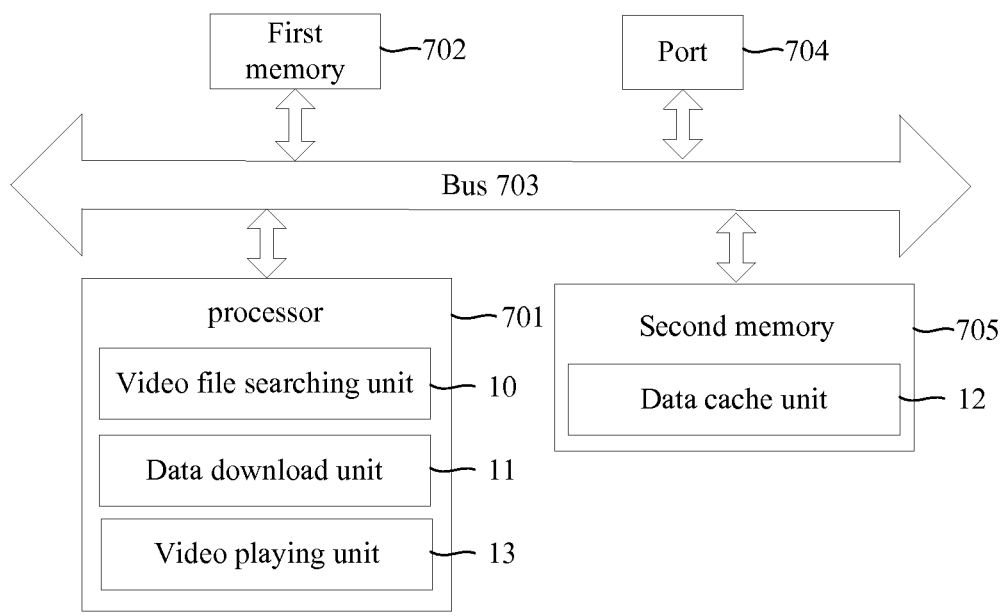
FIG. 7A is a schematic diagram illustrating hardware of a digital television terminal according to an example of the present disclosure.

FIG. 7A is a schematic diagram illustrating hardware of a digital television terminal according to an example of the present disclosure. As shown in FIG. 7A, the digital television terminal includes a processor 701, a first memory 702, bus 703, at least one port 704 and a second memory 705. The processor 701, the first memory 702, the at least one port 704 and the second memory 705 are interconnected by the bus 703.

The first memory 702 is configured to store machine-readable instructions.

The processor 701 is configured to execute the machine-readable instructions to:

receive a video search request inputted by a user, send the video search request to an offline task management server in an offline download system, so that the offline task management server may search a preset video file list according to the video search request; and receive a search result returned by the offline task management server; and receive a playing request for playing one video file selected by the user from the video search result, and download selected video file from the cloud storage server which is in the offline download system and associated with the preset video file list.

The second memory 705 is configured to cache downloaded video file.

The processor 701 is further configured to execute the machine-readable instructions to:

play the video file obtained from the second memory 705.

The processor 701 is further configured to execute the machine-readable instructions to:

perform network protocol data conversion between the digital television terminal and the offline task management server.

The processor 701 is further configured to execute the machine-readable instructions to:

receive the video search request inputted by the user, send a video search request on which the network protocol data conversion is performed to the offline task management server, receive a search result returned by the offline task management server.

The processor 701 is further configured to execute the machine-readable instructions to:

when a request for uploading a video file is received, obtain the video file from the second memory 705, and upload the video file to the cloud storage server or a remote digital television terminal.

The processor 701 is further configured to execute the machine-readable instructions to:

receive an offline download task request, and submit the offline download task request to the offline task management server.

The processor 701 is further configured to execute the machine-readable instructions to:

receive a request for querying progress of the offline download task, and submit the request for querying progress of the offline download task to the offline task management server, and receive a query result returned by the offline task management server.

The processor 701 is further configured to execute the machine-readable instructions to:

when the format of a video file which the user selects to play does not comply with the preset video file format, send an offline transcoding task request to the offline task management server, so that the offline download system may complete transcoding of the video file selected by the user, and store transcoded video file in the cloud storage server;

download the transcoded video file from the cloud storage server.

The processor 701 is further configured to execute the machine-readable instructions to:

perform correctness and completeness verification on data block downloaded from the cloud storage server, and then write data block which passes the verification into the data cache unit.

Figure 7B:
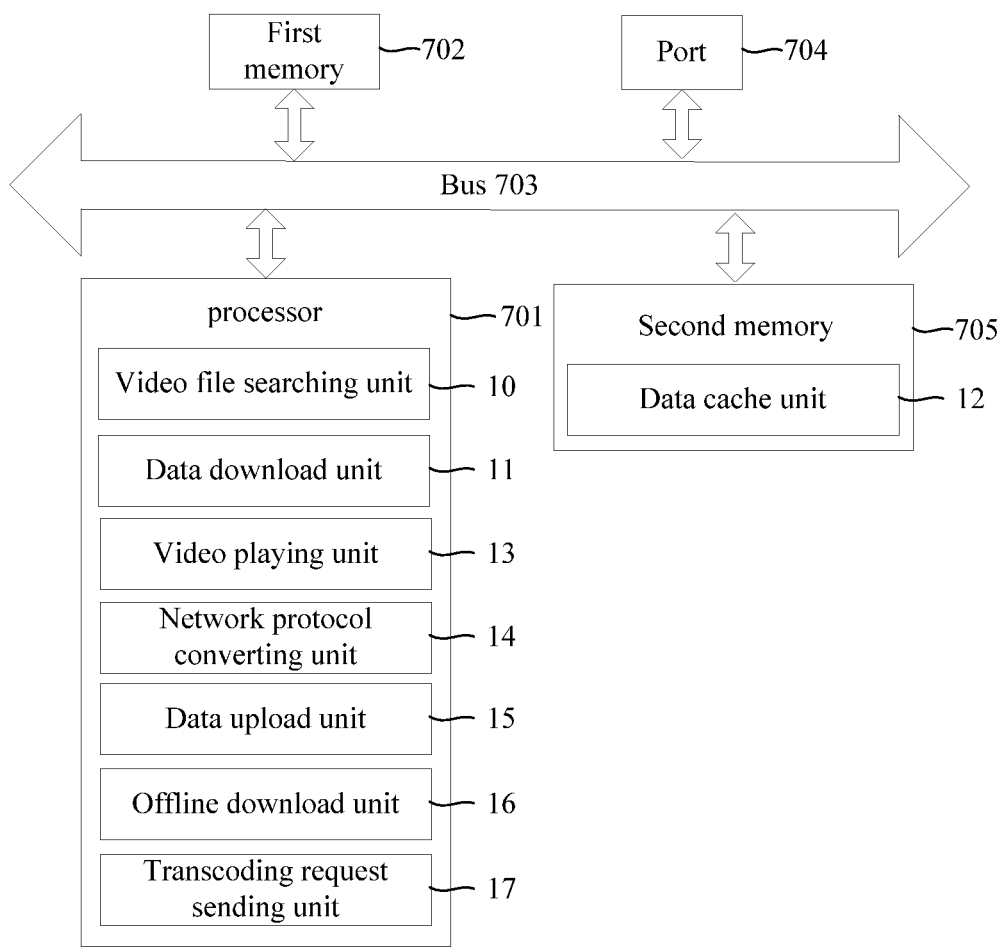
FIG. 7B is a schematic diagram illustrating hardware of a digital television terminal according to another example of the present disclosure.

As can be seen, when the machine readable instructions stored in the first memory 702 are executed by the processor 701, the functions of above mentioned video file searching unit 10, data download unit 11, video playing unit 13, network protocol converting unit 14, data upload unit 15, offline download unit 16 and transcoding request sending unit 17 may be achieved. The second memory 705 may achieve the function of the data cache unit 12. Therefore, the structure of hardware of the digital television terminal 1 provided by the present disclosure may be shown in FIG. 7B.

Every unit provided by examples of the present disclosure may be achieved by software (such as machine-readable instructions stored in a memory and executed by a processor), or hardware (such as a processor of application specific integrated circuit (ASIC)), or a combination of software and hardware. The specific implementation is not limited by the examples of the present disclosure. For example, one hardware module may include a specially designed permanent circuit or logic device (for instance, a dedicated processor, such as FPGA or ASIC) used to complete specific operations. The hardware module may also include programmable logic device or circuit (such as a general processor or other programmable process) temporarily configured by software to perform specific operations. As to how to achieve the hardware module, for example, achieved the hardware module by adopting mechanical manner, dedicated permanent circuit, or temporarily configured circuit (configured by software), it may be decided according to the price and time.

Those skilled in the art may understand that all or part of the procedures of the methods of the above examples may be implemented by relevant hardware instructed by machine readable instructions. The machine readable instructions may be stored in a computer readable storage medium. The machine readable instructions may make a terminal device (such as a mobile phone, a personal computer, a server or a network device) perform the method in examples of the present disclosure. The storage medium may be diskette, CD, ROM (Read-Only Memory) or RAM (Random Access Memory), and so on.

The foregoing description is only preferred embodiments of the present disclosure and is not used for limiting the protection scope thereof. Any modification, equivalent substitution, or improvement made without departing from the spirit and principle of the present disclosure should be covered by the protection scope of the present disclosure.

What is claimed is:

1. A digital television terminal, comprising: a first memory, a second memory and a processor in communication with the first memory and the second memory; wherein the first memory stores machine-readable instructions including offline download instructions, video file searching instructions, data download instructions and video playing instructions which may be executed by the processor; the second memory comprises a data cache;
   offline download instructions that when executed by the processor cause the processor to receive an offline download task request, and submit the offline download task request to an offline task management server of an offline download system, so that the offline task management server may generate a unique identification number for each independent offline download task, and write original link information of the offline download task in an offline task database of the offline download system; and an offline task distributor of the offline download system may, according to the load of the node in an offline download server farm, dynamically schedule offline download tasks to be performed on different nodes in the offline download server farm, to enable the offline download server farm to obtain a download link from the offline task database, perform the download according to the download link, and store downloaded multimedia content including a video file in a cloud storage server of the offline download system;
   the video file searching instructions that when executed by the processor cause the processor to receive a video search request inputted by a user, and send the video search request to an offline task management server of an offline download system, so that the offline task management server may search a preset video file list according to the video search request; receive a search result returned by the offline task management server;
   the data download instructions that when executed by the processor cause the processor to, when receiving a playing request for playing one video file selected by the user from the search result, download the video file selected by the user from a cloud storage server which is in the offline download system and associated with the preset video file list;
   the data cache is to cache the video file downloaded when the data download instructions are executed by the processor; and
   the video playing instructions that when executed by the processor cause the processor to play the video file obtained from the data cache.

2. The terminal according to claim 1, wherein the first memory further comprises:
   network protocol converting instructions that when executed by the processor cause the processor to perform network protocol data conversion between the digital television terminal and the offline task management server;
   after receiving the video search request inputted by the user, the video file searching instructions further cause the processor to send video search request converted when the network protocol converting instructions are executed by the processor to the offline task management server.

3. The terminal according to claim 1, wherein the first memory further comprises:
   data upload instructions that when executed by the processor cause the processor to, when receiving a request for uploading a video file, obtain the video file from the data cache, and upload the video file to the cloud storage server or a remote digital television terminal.

4. The terminal according to claim 1, wherein the offline download instructions further cause the processor to receive a request for querying progress of an offline download task, submit the request for querying progress of the offline download task to the offline task management server, and receive a query result returned by the offline task management server.

5. The terminal according to claim 1, wherein the first memory further comprises:
   transcoding request sending instructions that when executed by the processor cause the processor to, when a format of a video file which the user selects to play does not comply with a preset video file format, send an offline transcoding task request to the offline task management server, so that the offline download system may complete transcoding of the video file, and store transcoded video file in the cloud storage server;
   the data download instructions further cause the processor to download the transcoded video file from the cloud storage server.

6. The terminal according to claim 1, wherein the data download unit instructions further cause the processor to perform correctness and completeness verification on a data block downloaded from the cloud storage server, and then write a data block which passes the verification into the data cache unit.

7. A video file playing method, comprising:
   receiving an offline download task request, and submitting the offline download task request to an offline task management server of an offline download system, so that the offline task management server may generate a unique identification number for each independent offline download task, and write original link information of the offline download task in an offline task database of the offline download system; and an offline task distributor of the offline download system may, according to the load of the node in the offline download server farm, dynamically schedule offline download tasks to be performed on different nodes in the offline download server farm, to enable the offline download server farm to obtain a download link from the offline task database, perform the download according to the download link, and store downloaded multimedia content including a video file in a cloud storage server of the offline download system;
   receiving a video search request inputted by a user, sending the video search request to an offline task management server in an offline download system, so that the offline task management server may search a preset video file list according to the video search request; receiving a search result returned by the offline task management server;

receiving a playing request for playing one video file selected by the user from the search result, downloading the video file selected by the user from a cloud storage server which is in the offline download system and associated with the preset video file list; and caching and playing downloaded video file.

8. The method according to claim 7, wherein receiving a video search request inputted by a user, sending the video search request to an offline task management server in an offline download system, comprises:

receiving the video search request inputted by a user, performing network protocol data conversion on the video search request, and sending converted video search request to the offline task management server.

9. The method according to claim 7, further comprising:

when receiving a request for uploading a video file, obtaining the video file from cached video files, and uploading the video file to the cloud storage server or a remote digital television terminal.

10. The method according to claim 7, further comprising:

receiving a request for querying progress of an offline download task, submitting the request for querying progress of the offline download task to the offline task management server, and receiving a query result returned by the offline task management server.

11. The method according to claim 7, wherein receiving the playing request for playing one video file selected by the user from the search result, downloading the video file selected by the user from a cloud storage server which is in the offline download system and associated with the preset video file list, comprises:

when a format of the video file selected by the user does not comply with a preset video file format, sending an offline transcoding task request to the offline task management server, so that the offline download system may complete transcoding of the video file and store transcoded video file in the cloud storage server; and downloading the transcoded video file from the cloud storage.

12. A video file playing system, comprising:

a digital television terminal, comprising: a first memory, a second memory and a processor in communication with the first memory and the second memory; wherein the second memory comprises a data cache, and the first memory stores machine-readable instructions that when executed by the processor cause the processor to: receive a video search request inputted by a user, send the video search request to an offline task management server of an offline download system, and receive a search result returned by the offline task management server; receive a playing request for playing one video file selected by the user from the search result, download selected video file from a cloud storage server which is in the offline download system and associated with a preset video file list, cache downloaded video file in the data cache and play the downloaded video file; and the offline download system, comprising: a memory and a processor in communication with the memory; wherein the memory stores machine-readable instructions that when executed by the processor cause the processor to: when receiving the offline download task request sent by the digital television terminal, generate a unique identification number for each independent offline download task, and write original link information of the offline download task in an offline task database of the offline download system; and an offline task distributor of the offline download system may, according to the load of the node in the offline download server farm, dynamically schedule offline download tasks to be performed on different nodes in the offline download server farm, to enable the offline download server farm obtain a download link from the offline task database, perform the download according to the download link, and store downloaded multimedia content including a video file in a cloud storage server of the offline download system; when receiving the video search request sent by the digital television terminal, search the preset video file list according to the video search request, and return the search result to the digital television terminal.

13. The system according to claim 12, wherein the machine-readable instructions including video file searching instructions, data download instructions and video playing instructions which may be executed by the processor; the second memory comprises a data cache;

the video file searching instructions that when executed by the processor cause the processor to receive a video search request inputted by a user, and send the video search request to an offline task management server of an offline download system, so that the offline task management server may search a preset video file list according to the video search request; receive a search result returned by the offline task management server;

the data download instructions that when executed by the processor cause the processor to, when receiving a playing request for playing one video file selected by the user from the search result, download the video file selected by the user from a cloud storage server which is in the offline download system and associated with the preset video file list;

the data cache is to cache the video file downloaded when the data download instructions are executed by the processor; and the video playing instructions that when executed by the processor cause the processor to play the video file obtained from the data cache.

* * * * *